3,154,571
SELECTED ESTERS OF FLUORODITHIOCARBOX-YLIC ACIDS AND THEIR PREPARATION

William Joseph Middleton, Claymont, Del., assignor to E. I. du Pont de Nemours and Company, Wilmington, Del., a corporation of Delaware
No Drawing. Filed Aug. 28, 1959, Ser. No. 836,603
13 Claims. (Cl. 260—455)

This invention relates to, and has as its principal objects provision of, certain novel esters of fluorodithiocarboxylic acids and the preparation of the same.

The present novel esters have the general formula $R_fCSSR'$, wherein $R_f$ is a haloalkyl radical having fluorine on the α-carbon and R is a phenyl or an alkyl or haloalkyl radical. Preferably, the $R_f$ and R groups separately contain 1–12 carbons and the halogens in the haloalkyl groups are fluorine or chloride, i.e., of atomic number 9–17. These fluorinated dithiocarboxylic acid esters are volatile, red liquids. These products can be prepared by various methods.

The acylic esters of fluorodithiocarboxylic acids can be prepared by reaction of a thiol of the formula R'SH (where R' is alkyl or haloalkyl having not more than one fluorine on the α-carbon) and an alkali metal fluoride MF (where M is an alkali metal) with a compound of the formula $R_fCF_2SH$ or $R_fCSF$ (where $R_f$ is a haloalkyl radical having fluorine on the α-carbon). The reactions involved in this process are illustrated by the following equations:

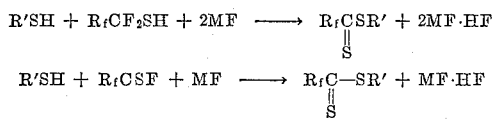

The reactions above proceed in slightly different fashion when all of any thiol employed carries more than one fluorine on α-carbon. In such cases, a dimer is first produced and must be cracked at an elevated temperature to yield the monomer: see Example VII below. The reactions, otherwise, are the same.

The amount of alkali metal fluoride used in the process should be at least that equivalent to the amount of hydrogen fluoride being removed from the reactants, i.e., 2 moles of alkali metal fluoride per mole of fluorinated thiol or 1 mole of alkali metal fluoride per mole of fluorothioacyl fluoride. However, it is preferable that an excess, e.g., up to a 10-fold excess, of alkali metal fluoride be used. In this process, any alkali metal that forms acid fluorides, e.g., NaF·HF or KF·HF, can be used. The physical form of the alkali metal fluoride is not critical. Alkali metal fluorides in the form of granules, pellets or powder are satisfactory.

The proportions of the thiol R'SH and the fluorinated thiol or fluorinated thioacyl fluoride employed in the process are not critical. One mole of R'SH is required for each mole of the fluorinated thiol or fluorinated thioacyl fluoride to form the esters of the fluorodithiocarboxylic acids of this invention. However, an excess of the thiol R'SH is conveniently used. The excess of this thiol serves as a solvent or reaction medium and can be recovered at the completion of the reaction.

The process can be carried out in the absence of any solvent or reaction medium. However, one can be used if desired. As indicated above, excess R'SH can serve as reaction medium. Likewise, any inert solvent, i.e., any solvent free of active hydrogen, can be used, for example, ethers or hydrocarbons are useful reaction media.

The reaction temperature is not critical since the dehydrofluorination of the fluorinated reactant by the alkali metal fluoride takes place to some extent at least at low temperatures such as −25° C. or even lower. However, the reaction proceeds faster at temperatures above 0° C. and a temperature between 15 and 75° C. is preferred. The reaction is conveniently carried out at atmospheric pressure at the temperature of the refluxing reaction system. Subatmospheric and superatmospheric pressures can also be employed if desired. Subatmospheric pressures are especially suitable when high boiling thiols and fluorinated reactants are employed.

The esters of the fluorodithiocarboxylic acids obtained in the process are isolated from the reaction mixture by conventional means. Distillation at atmospheric or reduced pressure is particularly convenient for isolating the product.

The fluorinated thiol starting materials used in the process can be prepared by the addition of hydrogen sulfide to the appropriate fluoroolefins, or by the reaction of fluoroalkyl disulfides having fluorine on the carbon joined to the sulfur with thiols such as thiophenyl on irradiation with ultraviolet light. The fluorothioacyl fluorides having fluorine on the α-carbon can be prepared by dehydrofluorination, by means of alkali metal fluorides, of the fluorinated thiols prepared as described above.

The products and process of this invention are illustrated in further detail in the following examples.

EXAMPLE I

Ethyl Chlorodifluorodithioacetate

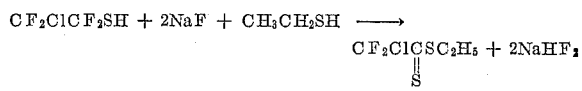

2-chlorotetrafluoroethanethiol (3.37 g.) (0.02 mole) is added dropwise to a stirred suspension of 4.2 g. (0.1 mole) of sodium fluoride in 12.4 g. (0.2 mole) of ethanethiol. After the addition is completed, the reaction mixture is heated to reflux for 30 minutes and then the volatile portion of the reaction mixture is distilled from the solid portion under reduced pressure (1 mm. of mercury). The distillate is redistilled and there is obtained 2.1 g. of ethyl chlorodifluorodithioacetate as a bright red liquid, B.P. 51–52° C./5 mm.

Analysis.—Calc'd for $C_4H_5ClF_2S$: C, 25.20%; H, 2.64%; F, 19.95%; S, 33.60%. Found: C, 25.20%; H, 2.79%; F, 20.96%; S, 33.73%.

The 2-chlorotetrafluoroethanethiol used as starting material in the above example is prepared as follows:

A stirred mixture of 50.3 g. (0.15 mole) of bis-2-chlorotetrafluoroethyldisulfide and 75 g. (0.68 mole) of thiophenol is irradiated with ultraviolet light for 4 days. During the irradiation a slow stream of nitrogen is bubbled through the reaction mixture and the effluent gases are condensed in a trap cooled by solid carbon dioxide and acetone. There is obtained on distillation of the condensate through an efficient fractionating column 3.1 g. of 2-chlorotetrafluoroethanethiol, B.P. 33° C., as a pale yellow liquid.

Analysis.—Calc'd for $C_2HClF_4S$: C, 14.25%; H, 0.60%; Cl, 21.04%; F, 45.09%; S, 19.02%. Found: C, 14.29%; H, 0.93%; Cl, 20.91%; F, 44.81%; S, 19.00%.

EXAMPLE II

Ethyl Trifluorodithioacetate

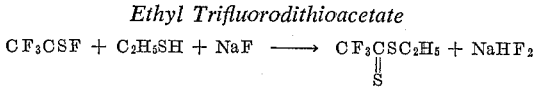

Trifluorothioacetyl fluoride (19.3 g.) (0.5 mole) is slowly distilled into a stirred suspension of 12.6 g. (0.3 mole) of powdered sodium fluoride in 31 g. (0.5 mole) of ethanethiol. Unreacted trifluorothioacetyl fluoride is returned to the reaction mixture by means of a reflux condenser cooled by a mixture of solid carbon dioxide and acetone. The temperature of the reaction mixture is maintained below 10° C. by means of an ice bath surrounding the reaction vessel. After the addition is completed, the reaction mixture is allowed to warm to room temperature (25° C.) and is then flash-distilled under vacuum at room temperature to separate it from the sodium fluoride. The resulting red-orange distillate is fractionally distilled. There is obtained 24.9 g. of ethyl trifluorodithioacetate as a red-orange liquid, B.P. 134° C., refractive index, $n_D^{24.5}$, 1.4800.

*Analysis.*—Calc'd for $C_4H_5F_3S_2$: C, 27.58%; H, 2.89%; F, 32.72%; S, 36.81%. Found: C, 28.09%; H, 3.42%; F, 32.69%; S, 37.19%.

Trifluorothioacetyl fluoride is described and claimed in my U.S. Patent 3,069,395.

EXAMPLE III

*Phenyl Chlorodifluorodithioacetate*

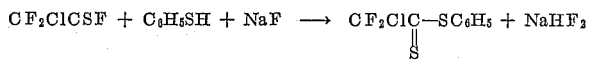

A mixture of 14.8 g. (0.1 mole) of chlorodifluorothioacetyl fluoride [preparable according to J. Gen. Chem. U.S.S.R.-Eng. Tr. 27, 2301 (1957)], 50 ml. of diethyl ether, 11.0 g. (0.1 mole) of benzenethiol, and 12.6 g. (0.3 mole) of powdered sodium fluoride is stirred at 0° C. for 2 hours, and then at room temperature (24° C.) for 4 hours. The mixture slowly becomes dark red. The solids are separated by filtration, and the filtrate is distilled at reduced pressure. There is obtained 17.2 g. of phenyl chlorodifluorodithioacetate as a deep red oil, B.P. 85–86° C./1.5 mm., $n_D^{24}$, 1.5880, $$\lambda_{max.}^{cyclohexane}\ 518\ m\mu\ (\epsilon=26)$$

*Analysis.*—Calc'd for $C_8H_5ClF_2S_2$: C, 40.25%; H, 2.13%; Cl, 14.83%; F, 15.90%; S, 26.86%. Found: C, 40.29%; H, 2.52%; Cl, 14.73%; F, 16.11%; S, 27.31%.

EXAMPLE IV

*Trifluoromethyl Trifluorodithioacetate*

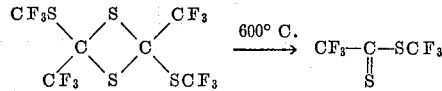

A 2.5 cm. heat-resistant glass tube packed for a length of 25 cm. with quartz rings is connected to a trap cooled with a solid carbon dioxide-acetone bath and the system is evacuated to 0.1 mm. Hg with an oil pump. The packed tube is heated to 600° C. and 5.0 g. of 2,4-bis(trifluoromethyl) - 2,4 - bis(trifluoromethylthio)-1,3-dithietane is added dropwise over a period of 30 minutes. The condensate collected in the cold trap is distilled under reduced pressure. There is obtained 3.7 g. of trifluoromethyl trifluorodithioacetate as a wine-red liquid; B.P. ca. 0° C. at 50 mm.;

$$\lambda_{max.}^{cyclohexane}\ 532\ m\mu\ (\epsilon=11.7)$$

*Analysis.*—Calc'd for $C_3F_6S_2$: C, 16.82%; F, 53.23%; S, 29.94%. Found: C, 17.40%; F, 54.68%; S, 28.57%.

The 2,4 - bis(trifluoromethyl)-2,4-bis(trifluoromethylthio)-1,3-dithietane used as starting material in Example IV is prepared as follows:

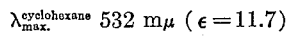

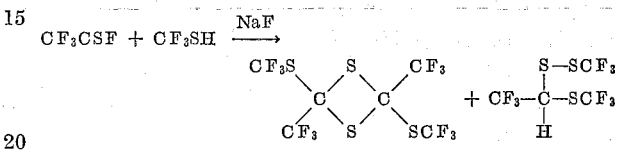

A heavy walled glass tube containing 20 g. of sodium fluoride pellets, 15 ml. (22.5 g.) of trifluorothioacetyl fluoride and 15 ml. of trifluoromethanethiol is allowed to remain at room temperature for one week. The tube is cooled to −78° C. and opened, and the liquid portion is distilled. There is obtained 14.3 g. of colorless trifluoromethyl 2,2,2-trifluoro-1-trifluoromethylthioethyl disulfide. B.P. 57–58° C./78 mm., $n_D^{24}$, 1.3757 and 10.9 g. of colorless 2,4 - bistrifluoromethyl - 2,4 - bistrifluoromethylthio-1,3-dithietane, B.P. 55–56° C./10 mm., $n_D^{24}$, 1.3995. The structures of both compounds are confirmed by n-m-r fluorine and hydrogen spectra.

*Analysis.*—Calc'd for $C_4HF_9S_3$: C, 15.19%; F, 54.07%; S, 30.41%; found: C, 15.53%; F, 54.35%; S, 30.70%. Calc'd for $CF_{12}S_4$: C, 16.82%; F, 53.23%; S, 29.94%; found: C, 17.27%; F, 54.72%; S, 30.03%.

In addition to the specific products illustrated by the examples, the fluorodithiocarboxylic acid esters of this invention having the general formula $R_fCSSR$ (wherein the symbols have the meanings defined hereinbefore) include those listed in the right-hand column of the table below. The left-hand column of this table lists the reactants from which these products are made by processes illustrated by the examples.

TABLE

| Reactants | Fluorodithiocarboxylic Acid Esters |
|---|---|
| $HClCFCF_2SH+CH_3SH+2NaF$ | $HClCFCSCH_3$ <br> $\parallel$ <br> $S$ |
| $HCF_2CSF+C_4H_9SH+KF$ | $HCF_2CSC_4H_9$ <br> $\parallel$ <br> $S$ |
| $CF_3CF_2CF_2SH+C_3H_7SH+2NaF$ | $CF_3CF_2CSC_3H_7$ <br> $\parallel$ <br> $S$ |
| $H_2CFCSF+CCl_3CH_2SH+NaF$ | $H_2CFCSCH_2CCl_3$ <br> $\parallel$ <br> $S$ |
| $CH_3CH_2CH_2CF_2CSF+C_2H_5SH+NaF$ | $CH_3CH_2CH_2CF_2CSC_2H_5$ <br> $\parallel$ <br> $S$ |
| $CF_3CF_2CSF+HS\text{--}C_{10}H_7+NaF$ | $CF_3CF_2\text{--}C\text{--}S\text{--}C_{10}H_7$ <br> $\parallel$ <br> $S$ |

The esters of fluorodithiocarboxylic acids are useful in a variety of applications. They are useful as soluble dyes or markers for hydrocarbons. For example, a few drops of ethyl trifluorodithioacetate added to 10 ml. portions of benzene, pentane and gasoline colors each of these materials an orange-red. These solutions remained colored for more than one month.

Since obvious modifications and equivalents in the invention will be evident to those skilled in the chemical art, I propose to be bound solely by the appended claims.

The embodiments of the invention in which an exclusive property or privilege is claimed are defined as follows:

1. Halogenated compounds in which all halogen is of atomic number 9–17 of the formula $$R_f-\overset{\overset{S}{\|}}{C}-SR$$

wherein

R is a member of the group consisting of phenyl, naphthyl and alkyl and haloalkyl of up to 12 carbons and $R_f$ is α-fluoroalkyl of up to 12 carbons.

2. An alkyl chlorodifluorodithioacetate wherein the alkyl group is of up to 12 carbons.
3. Ethyl chlorodifluorodithioacetate.
4. An alkyl trifluorodithioacetate wherein the alkyl group is of up to 12 carbons.
5. Ethyl trifluorodithioacetate.
6. Phenyl chlorodifluorodithioacetate.
7. A haloalkyl trifluorodithioacetate wherein the haloalkyl group is of up to 12 carbons and all halogen is of atomic number 9–35.
8. Trifluoromethyl trifluorodithioacetate.
9. The process of preparing an ester of an acyclic fluorodithiocarboxylic acid which comprises reacting together, at a temperature of about —25 to +75° C., an alkali metal fluoride, a member of the group consisting of benzenethiol and alkyl and haloalkyl thiols of up to 12 carbons, the haloalkyl thiols having not more than one fluorine on α-carbon, and a member of the group consisting of $R_fCF_2SH$ and $R_fCSF$ where $R_f$ is a haloalkyl radical of up to 12 carbons having fluorine on α-carbon, all halogen involved in the reaction being of atomic number 9–17.
10. The process of preparing ethyl chlorodifluorodithioacetate which comprises reacting together an alkali metal fluoride, 2-chlorotetrafluoroethanethiol, and ethanethiol.
11. The process of preparing ethyl trifluorodithioacetate which comprises reacting together an alkali metal fluoride, trifluorothioacetyl fluoride, and ethanethiol.
12. The process of preparing phenyl chlorodifluorodithioacetate which comprises reacting together an alkali metal fluoride, chlorodifluorothioacetyl fluoride, and benzenethiol.
13. The process of preparing trifluoromethyl trifluorodithioacetate which comprises pyrolyzing 2,4-bistrifluoromethyl-2,4-bistrifluoromethylthio-1,3-dithietane.

References Cited in the file of this patent
UNITED STATES PATENTS

| | | |
|---|---|---|
| 2,425,426 | Joyce | Aug. 12, 1947 |
| 2,525,774 | Coonradt et al. | Oct. 17, 1950 |
| 2,549,576 | Coonradt et al. | Apr. 17, 1951 |
| 2,599,432 | Caesar | June 3, 1952 |
| 2,630,448 | Crouch et al. | Mar. 3, 1953 |
| 2,702,306 | Gall | Feb. 15, 1955 |
| 2,820,807 | Man | Jan. 21, 1958 |
| 2,823,210 | Johnson | Feb. 11, 1958 |
| 2,900,394 | Geering | Aug. 18, 1959 |
| 2,992,091 | Harman et al. | July 11, 1961 |

OTHER REFERENCES

Lowy et al.: "Introduction to Organic Chemistry," 6th ed. (1945), page 213, J. Wiley and Sons, Inc., New York.

Hauptschein et al.: J.A.C.S., 74, 1953, pages 4005–4006.

Noller: "Chemistry of Organic Compounds," 2nd ed., pages 272 (1957).